US006615636B2

(12) United States Patent
Easterbrook

(10) Patent No.: US 6,615,636 B2
(45) Date of Patent: *Sep. 9, 2003

(54) METHOD AND APPARATUS FOR IMPROVING THE FATIGUE LIFE OF COMPONENTS AND STRUCTURES USING THE STRESSWAVE PROCESS

(75) Inventor: Eric T. Easterbrook, Kent, WA (US)

(73) Assignee: Stresswave, Inc., Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/858,325

(22) Filed: May 15, 2001

(65) Prior Publication Data
US 2002/0011091 A1 Jan. 31, 2002

Related U.S. Application Data

(63) Continuation-in-part of application No. 09/401,065, filed on Sep. 22, 1999, now Pat. No. 6,230,537, which is a continuation-in-part of application No. 09/270,428, filed on Mar. 16, 1999, now Pat. No. 6,389,865.
(60) Provisional application No. 60/078,356, filed on Mar. 17, 1998.

(51) Int. Cl.$^7$ .......................... B21D 28/26; B21D 31/00
(52) U.S. Cl. ............................. 72/412; 72/334; 72/377
(58) Field of Search .......................... 72/334, 377, 327, 72/412; 29/243.53, 243.54, 525.06, 525; 403/408.1

(56) References Cited

U.S. PATENT DOCUMENTS

| 2,697,953 A | | 12/1954 | Chapman | |
| 2,810,191 A | * | 10/1957 | Hanna | |
| 2,909,281 A | | 10/1959 | Koskinen | |
| 3,110,086 A | * | 11/1963 | Phillips | |
| 3,270,410 A | * | 9/1966 | Salter | |
| 3,434,327 A | * | 3/1969 | Speakman | |
| 3,551,015 A | | 12/1970 | Whiteside | |
| 3,796,086 A | * | 3/1974 | Phillips | |
| 3,803,898 A | * | 4/1974 | Speakman | |
| 3,895,922 A | * | 7/1975 | Phillips | |
| 4,493,141 A | * | 1/1985 | Krezak | |
| 4,711,115 A | * | 12/1987 | Sukonnik | |
| 4,771,627 A | | 9/1988 | Speakman | 72/370 |
| 4,836,705 A | | 6/1989 | La Barge et al. | 403/282 |
| 4,918,970 A | | 4/1990 | Ishinaga | 72/407 |
| 5,024,075 A | | 6/1991 | Simonetto | 72/407 |
| 5,746,085 A | | 5/1998 | Harada et al. | 72/355.6 |
| 5,841,033 A | * | 11/1998 | Burris et al. | 72/362 |
| 5,943,897 A | * | 8/1999 | Tsue | |

FOREIGN PATENT DOCUMENTS

| AU | 2121120 | * | 5/1993 |
| JP | 2-151321 | * | 6/1990 |
| JP | 4-138824 | * | 5/1992 |

* cited by examiner

Primary Examiner—Daniel C. Crane
(74) Attorney, Agent, or Firm—R. Reams Goodloe, Jr.

(57) ABSTRACT

Metal coldworking tooling and a method of employing such tooling. The tooling is used to produce deformation in a workpiece, preferably via use of stress waves, to provide a selected beneficial residual stress profile in the workpiece, in order to provide high fatigue life structures in a minimum number of manufacturing steps. Preferably, action of an indenter causes propagation of stress waves to coldwork a workpiece, causing dimples in the workpiece. Preferably, the dimples are provided with a shape formed by application of a pre-selected pressure profile to the workpiece surface. By optimized use of the method, a relatively uniform beneficial residual stress profile is provided at both the surface and at the midplane apertures in a workpiece, so as to improve overall fatigue life.

11 Claims, 18 Drawing Sheets

FIG. 1a  TREATMENT OF SOLID BAR
FIG. 1(a)(1)
① SETUP STEP
FIG. 1(a)(2)
② PROCESSING
FIG. 1(a)(3)
③ DRILL HOLE
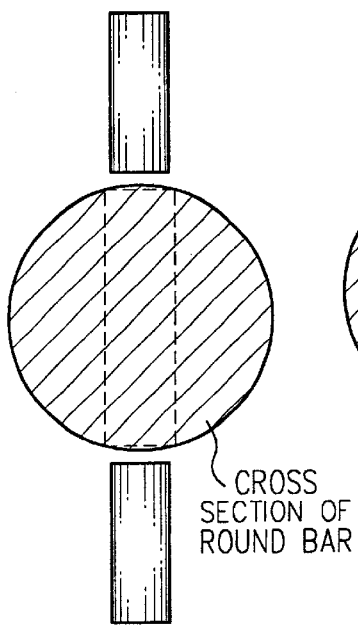
CROSS SECTION OF ROUND BAR
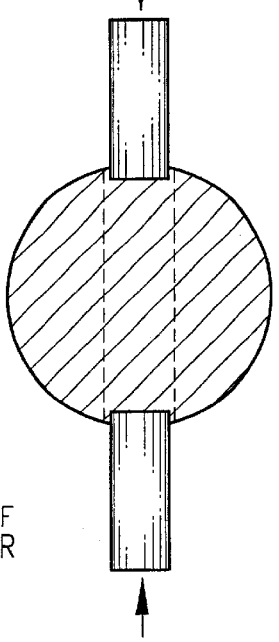
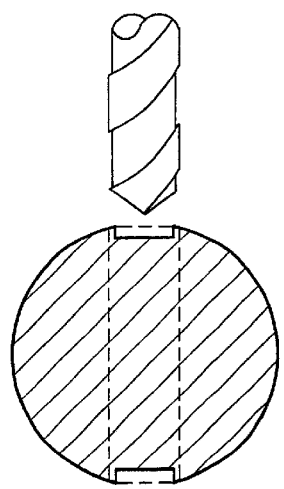
FIG. 1(a)(4)
④ FINAL CONFIGURATIONS
FIG. 1(a)(5)
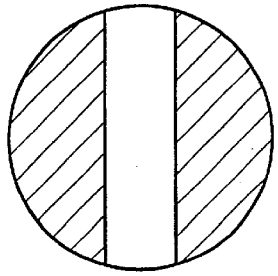
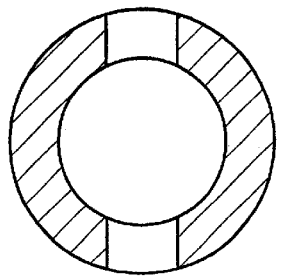

FIG. 1b TREATMENT OF AN INITIALLY OVERSIZED SOLID BAR
FIG. 1(b)(1) ① SETUP STEP
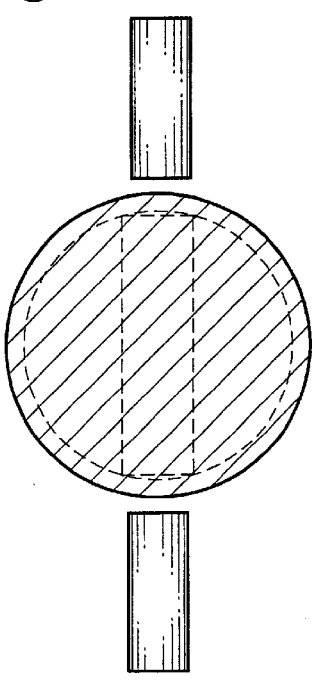
FIG. 1(b)(2) ② PROCESSING
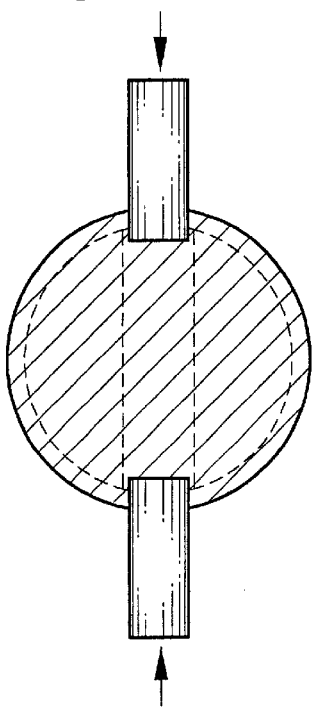
FIG. 1(b)(3) ③ DRILL HOLE
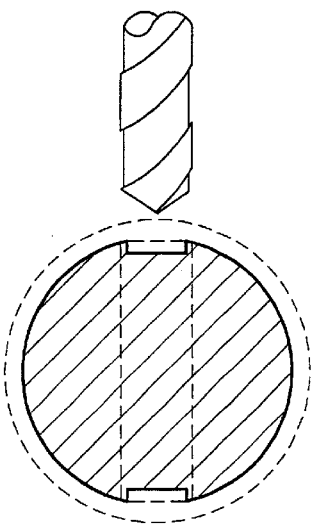
FIG. 1(b)(4) ④ FINAL CONFIGURATIONS
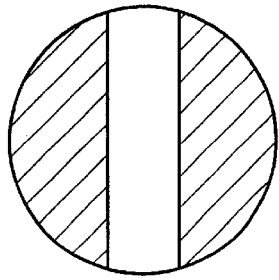
FIG. 1(b)(5)
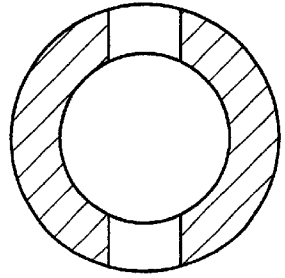

FIG. 1c  TREATMENT OF AN INITIALLY OVERSIZED SOLID BAR WITH OPPOSING "FLATS" TO FACILITATE TREATMENT
FIG. 1(c)(1)
① SETUP STEP
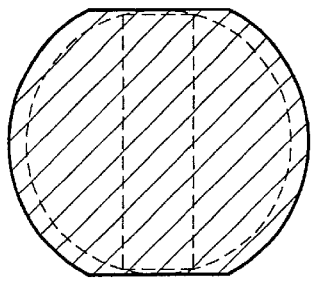
FIG. 1(c)(2)
② PROCESSING
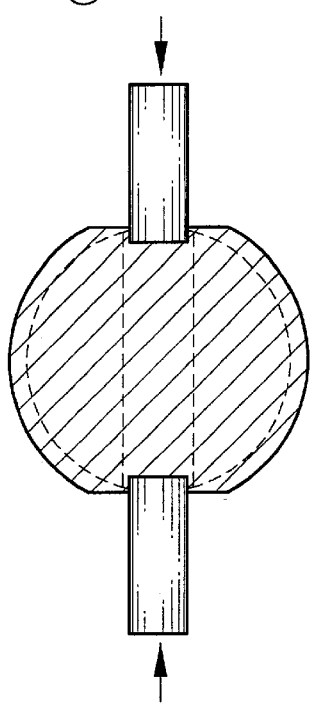
FIG. 1(c)(3)
③ DRILL HOLE
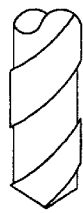
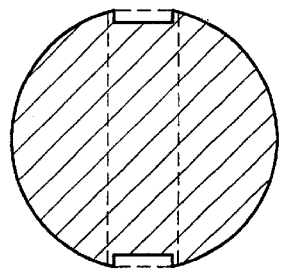
FIG. 1(c)(4)
④ FINAL CONFIGURATIONS
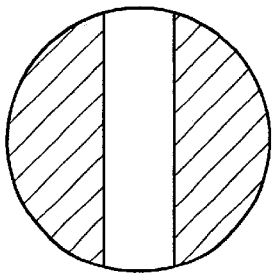
FIG. 1(c)(5)
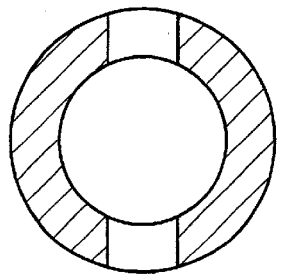

FIG. 1d TREATMENT OF A SOLID BAR WITH MILLED OR INTEGRAL "FLATS" TO FACILITATE THE PROCESS
FIG. 1(d)(1)
① SETUP STEP
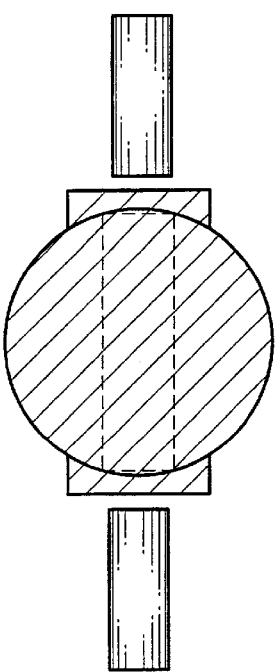
FIG. 1(d)(2)
② PROCESSING
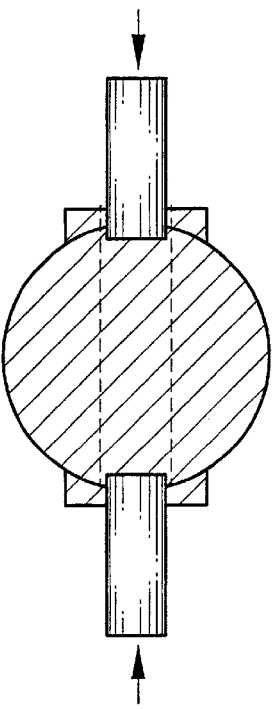
FIG. 1(d)(3)
③ DRILL HOLE
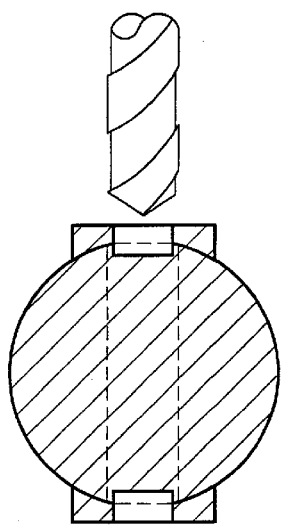
FIG. 1(d)(4)
④ FINAL CONFIGURATIONS
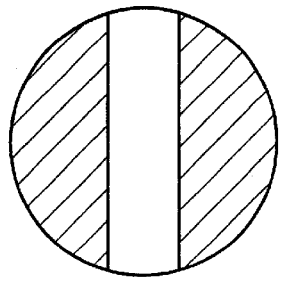
FIG. 1(d)(5)
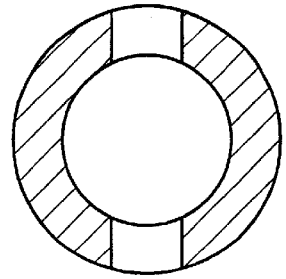

FIG. 2a TREATMENT OF TUBULAR BAR WITH INTERNAL SUPPORT
FIG. 2(a)(1)
① SETUP STEP
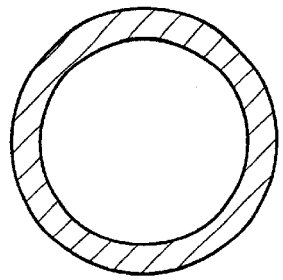
FIG. 2(a)(2)
② PROCESSING
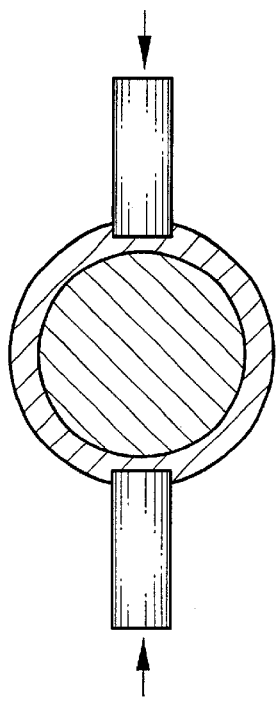
FIG. 2(a)(3)
③ DRILL HOLE
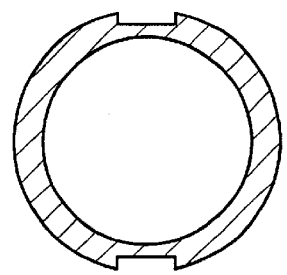
FIG. 2(a)(4)
④ FINAL CONFIGURATIONS
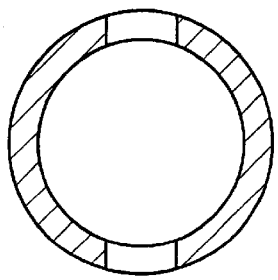

FIG. 2b TREATMENT OF TUBULAR BAR WITH INTERNAL SUPPORT—SIDE VIEW
FIG. 2(b)(1)
① END VIEW OF PROCESSING STEP
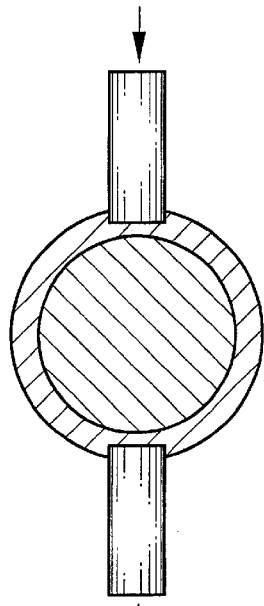
FIG. 2(b)(2)
② SIDE VIEW OF PROCESSING STEP
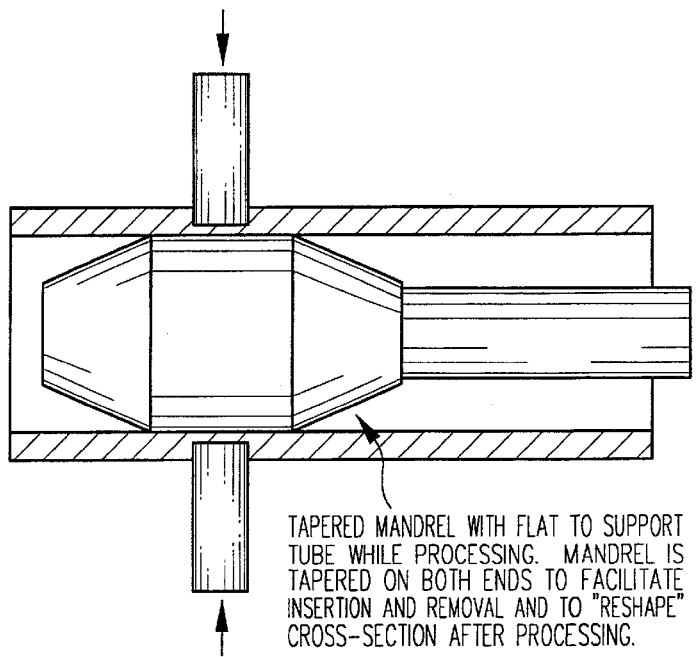
TAPERED MANDREL WITH FLAT TO SUPPORT TUBE WHILE PROCESSING. MANDREL IS TAPERED ON BOTH ENDS TO FACILITATE INSERTION AND REMOVAL AND TO "RESHAPE" CROSS-SECTION AFTER PROCESSING.

FIG. 2c TREATMENT OF TUBULAR BAR WITHOUT INTERNAL SUPPORT
FIG. 2(c)(1)
① SETUP STEP
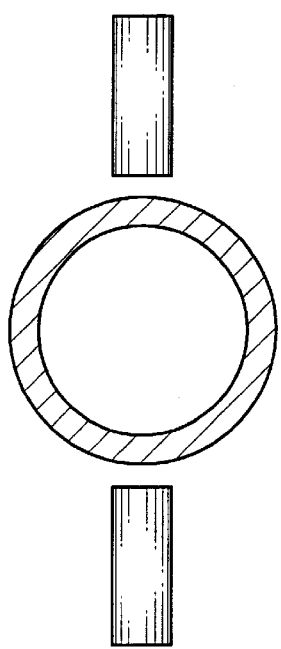
FIG. 2(c)(2)
② PROCESSING
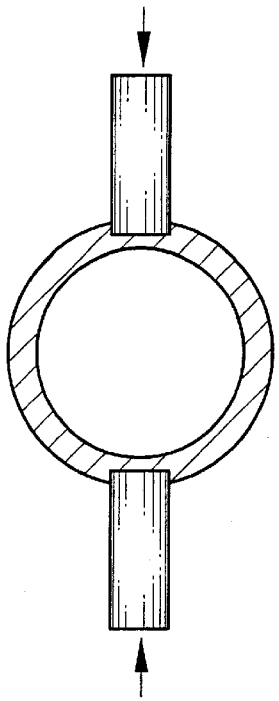
FIG. 2(c)(3)
③ DRILL HOLE
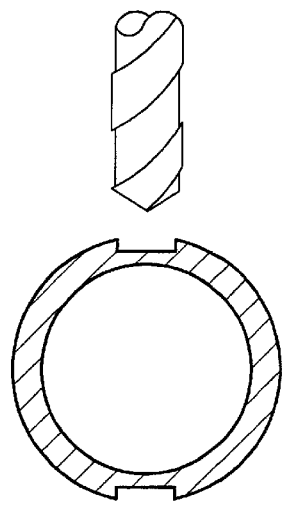
FIG. 2(c)(4)
④ FINAL CONFIGURATIONS
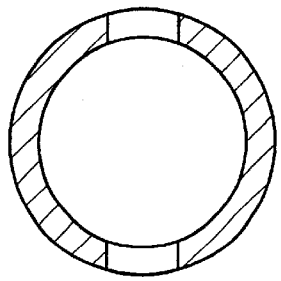

FIG. 3 TREATMENT OF A STRUCTURE WITH TWO TAPERED SURFACES
FIG. 3(a)
① PROCESS SETUP STEP
FIG. 3(b)
② DRILL
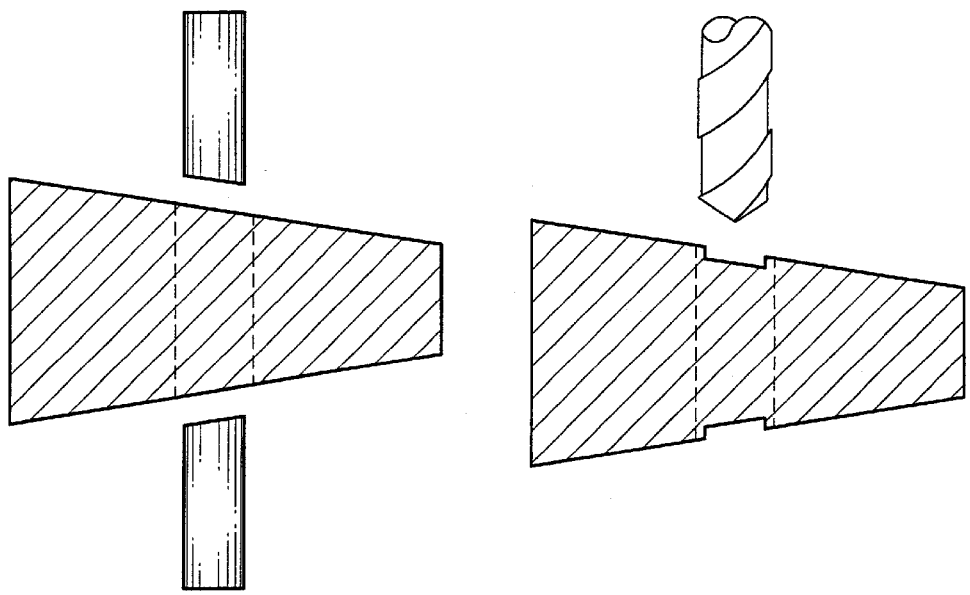
FIG. 3(c)
③ FINAL CONFIGURATION
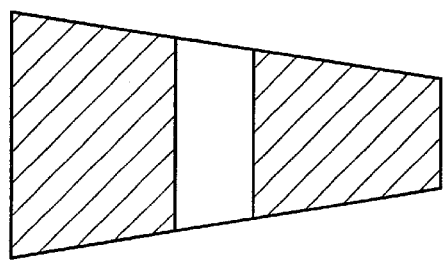

FIG. 4  TREATMENT OF A STRUCTURE WITH ONE TAPERED AND ONE FLAT SURFACE WITH AND WITHOUT INTEGRAL "FLAT"

① PROCESS SETUP STEP

② DRILL

③ FINAL CONFIGURATION

FIG. 5 TREATMENT OF A LUG STRUCTURE STARTING WITH A SOLID STRUCTURE
FIG. 5(a) ① PROCESS
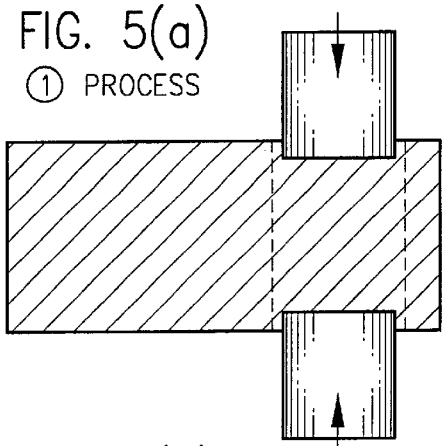
FIG. 5(b)
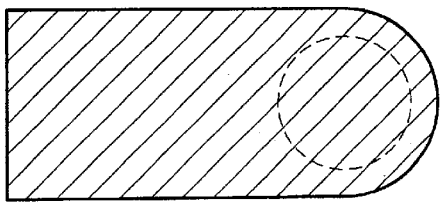
FIG. 5(c) ② MILL SLOT AND MACHINE HOLES
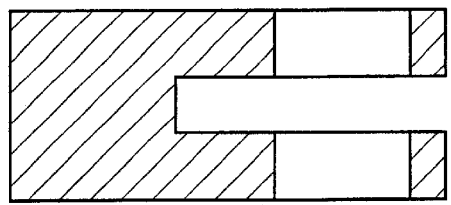
FIG. 5(d)
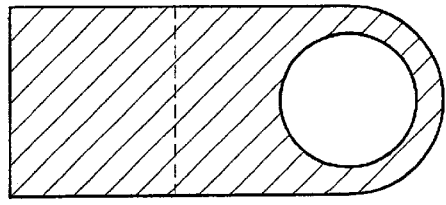

FIG. 6  TREATMENT OF A THREADED HOLE

① PROCESS

② DRILL HOLE

③ MACHINE OR TAP THREADS

④ FINISHED HOLE

FIG. 7a SIMULTANEOUS OR SEQUENTIAL TREATMENT OF A PATTERN OF HOLES, ONE-SIDED OR TWO SIDED
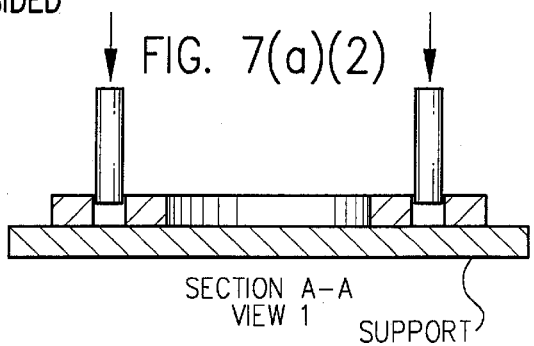
FIG. 7(a)(2)
SECTION A-A
VIEW 1    SUPPORT
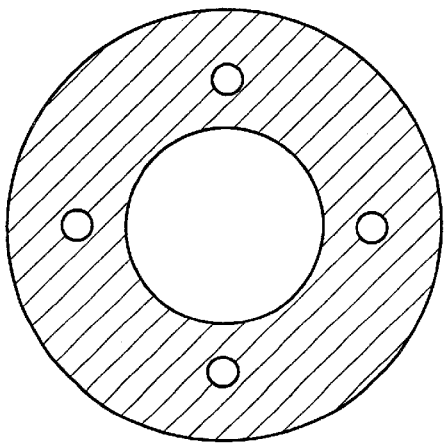
FIG. 7(a)(1)
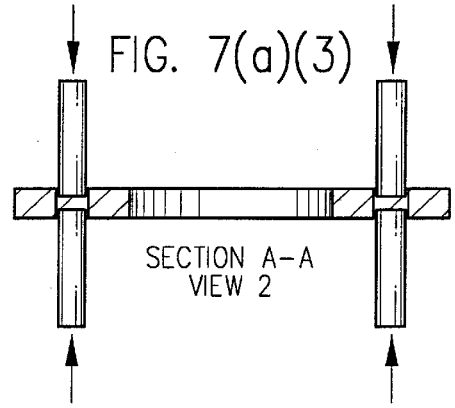
FIG. 7(a)(3)
SECTION A-A
VIEW 2

FIG. 7b SIMULTANEOUS OR SEQUENTIAL TREATMENT OF A PATTERN OF HOLES, ONE-SIDED OR TWO-SIDED WITH INTERNAL SUPPORT
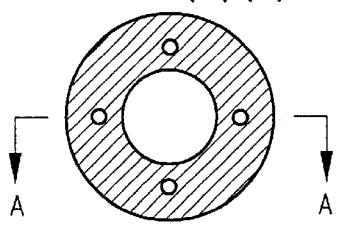
FIG. 7(b)(1)
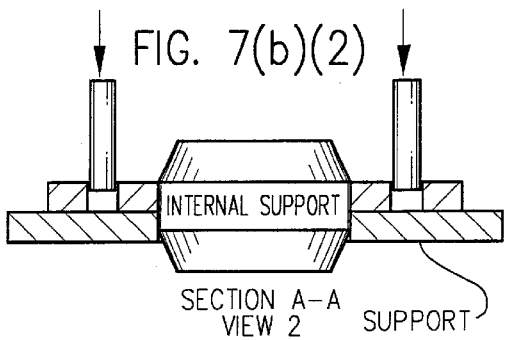
FIG. 7(b)(2)
SECTION A-A
VIEW 2
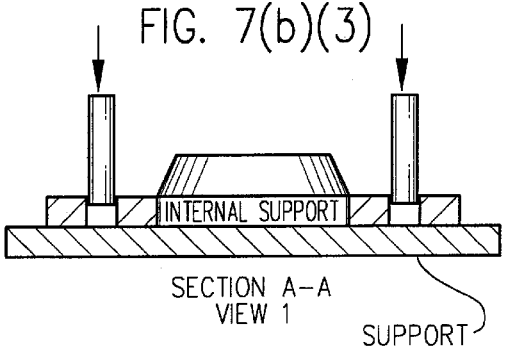
FIG. 7(b)(3)
SECTION A-A
VIEW 1
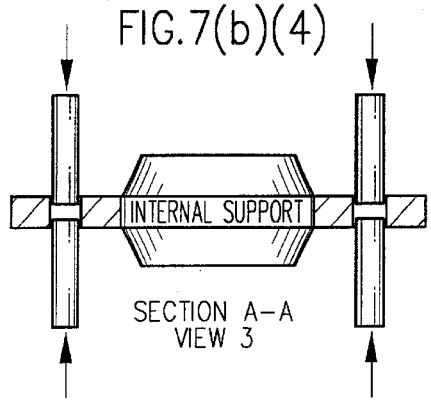
FIG. 7(b)(4)
SECTION A-A
VIEW 3

FIG. 8  TREATMENT OF A STEPPED HOLE

① PROCESS LARGE DIAMETER

② MACHINE LARGE HOLE DIAMETER

③ PROCESS SMALL DIAMETER

④ FINISHED PART AFTER SMALL DIAMETER MACHINED

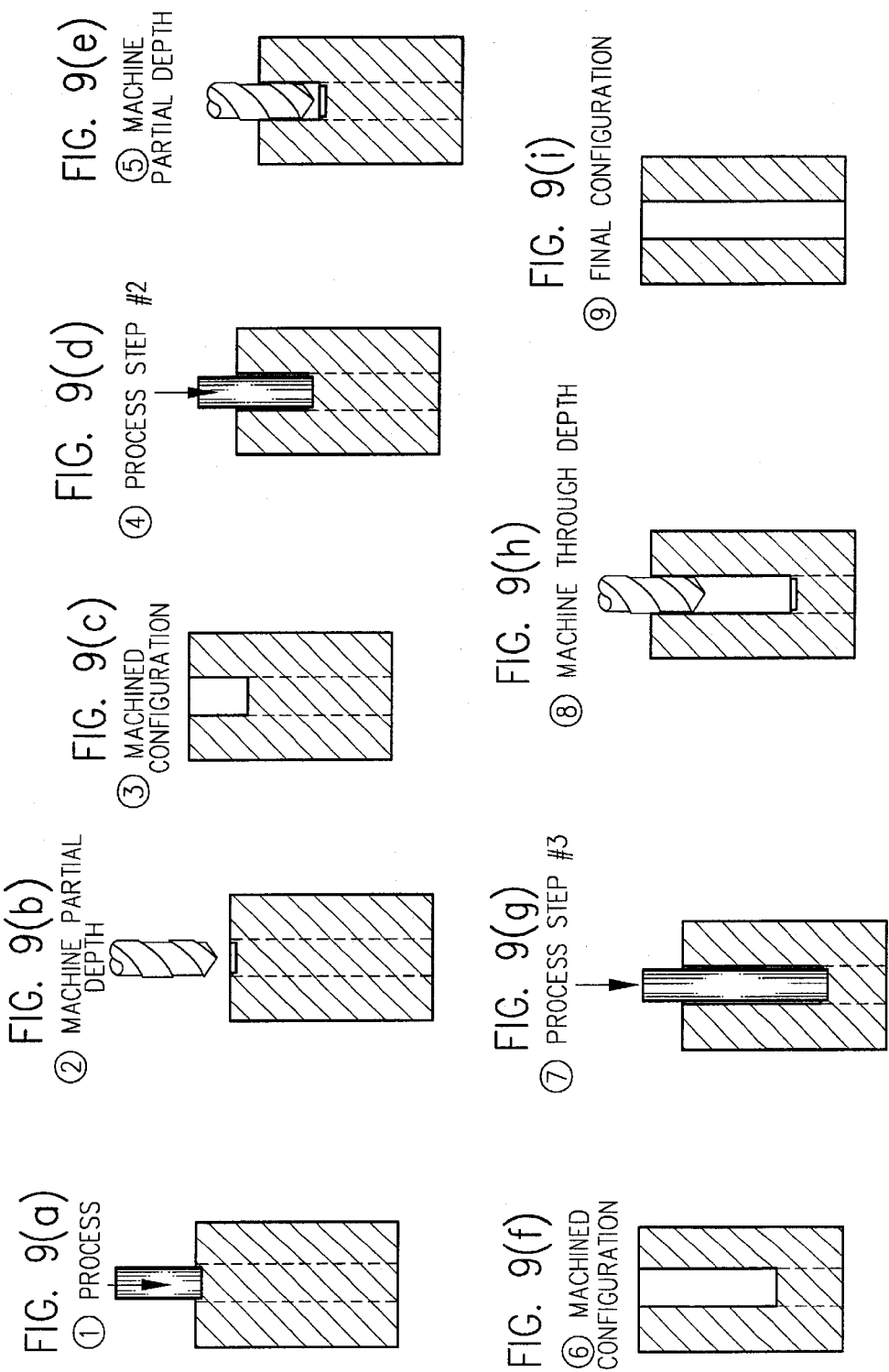

FIG. 10 TREATMENT OF A SLOTTED STRUCTURE SUCH AS A GEAR OR DISK
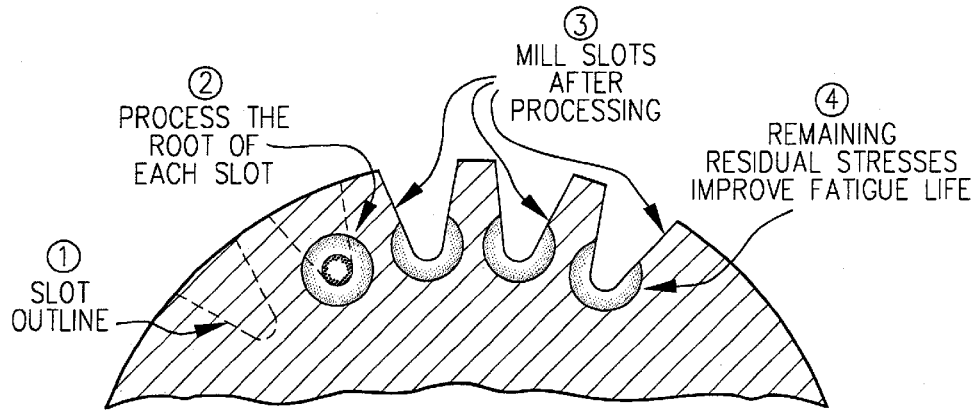
① SLOT OUTLINE
② PROCESS THE ROOT OF EACH SLOT
③ MILL SLOTS AFTER PROCESSING
④ REMAINING RESIDUAL STRESSES IMPROVE FATIGUE LIFE
FIG. 11 TREATMENT OF A ROUND APERTURE USING AN OVERLAPPING PATTERN OF DIMPLES AROUND THE PERIMETER
FIG. 11(a)
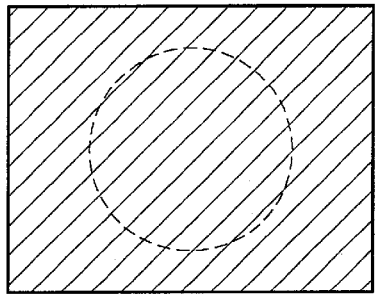
FIG. 11(b)
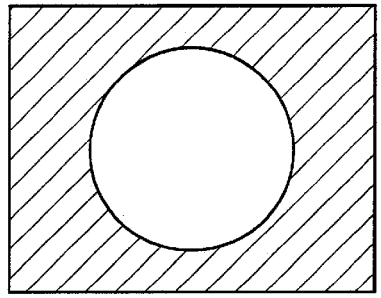
FIG. 11(c)
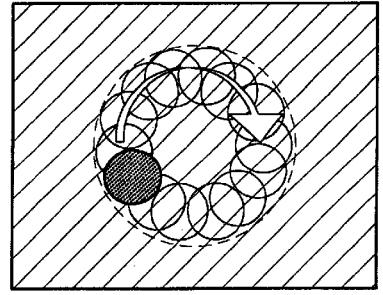

FIG. 12 TREATMENT OF A NON-CIRCULAR APERTURE USING AN OVERLAPPING PATTERN OF DIMPLES AROUND THE PERIMETER

FIG. 12(a)
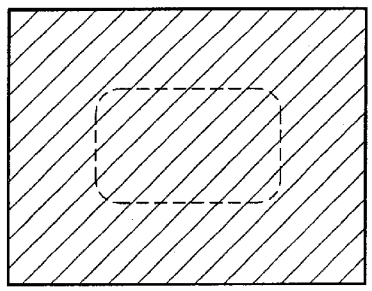

FIG. 12(b)
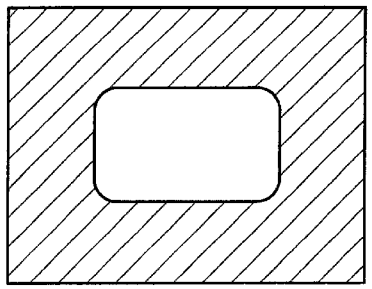

FIG. 12(c)
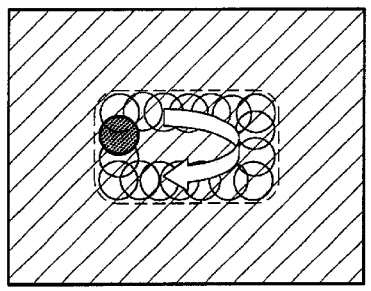

FIG. 14
INDENTER END SHAPE USING FLAT, CHAMFERED AND CURVED PORTIONS FOR APPROXIMATING A UNIFORM PRESSURE PROFILE

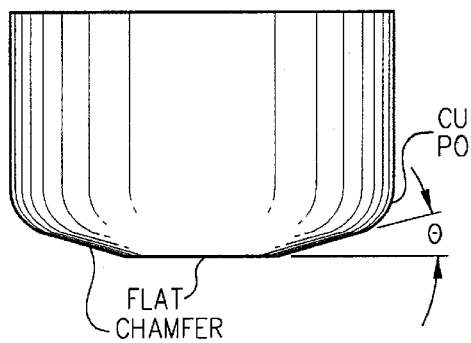

CURVED PORTION
θ
FLAT
CHAMFER

FIG. 15
INDENTER END SHAPE FOR APPROXIMATING A UNIFORM PRESSURE PROFILE WITH DRILL CENTER FEATURE

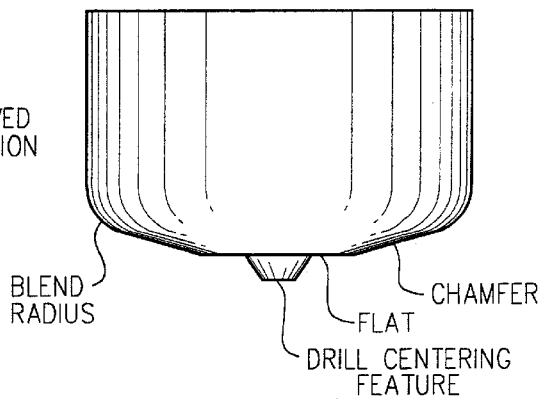

BLEND RADIUS
CHAMFER
FLAT
DRILL CENTERING FEATURE

FIG. 13 TREATMENT OF TWO-LAYER STACKUP OF COMPOSITE MATERIAL AND METAL

①
UPPER INDENTER SLIPS PAST STARTING HOLE IN COMPOSITE

COMPOSITE
TITANIUM

②
UNDERLYING TITANIUM IS TREATED

③

④
HOLE DRILLING PROCESS REMOVES INDENTATIONS

METHOD AND APPARATUS FOR IMPROVING THE FATIGUE LIFE OF COMPONENTS AND STRUCTURES USING THE STRESSWAVE PROCESS

This application is a continuation-in-part of application(s) application Ser. No. 09/401,065 filed Sep. 22, 1999 and issued on May 15, 2001 as U.S. Pat. No. 6,230,537, which application was a continuation-in-part of application Ser. No. 09/270,428 filed on Mar. 16, 1999 now U.S. Pat. No. 6,389,865 which claimed the benefit of provisional application No. 60/078,356 filed on Mar. 17, 1998.

TECHNICAL FIELD

This invention is related to novel methods for manufacturing components and structures, such as metal components and structures, and more particularly for parts having apertures therein, or cutouts therein, and which parts are subject to repeated or prolonged stress, in order to improve structural integrity by providing improved resistance to metal fatigue. Such methods, and the apparatus made thereby, have widespread applications in components and structures for transportation systems, and for medical devices (particularly metal parts having apertures therein). More specifically, the invention is applicable to fabrication of structures and components having apertures designed for accommodating fasteners such as rivets and bolts, as well as for those for routing tubing, cable or wires (including, for example for fuel flow), or those apertures simply provided for weight reduction purposes, so that finished parts and the apparatus in which the components or structures are installed, have improved resistance to metal fatigue and consequently better structural integrity.

BACKGROUND

Metal fatigue is a problem common to just about everything that experiences cyclic stresses. Such problems are especially important in transportation equipment, such as aircraft, ships, trains, cars, and the like. Metal fatigue can be defined as the progressive damage, usually evidenced in the form of cracks, that occurs to structures as a result of cyclic loading. This failure mode is not to be confused with a failure due to overload. The lower surface of an aircraft wing is a classical example of the type of loading that produces fatigue. The wing is subjected to various cyclic stresses resulting from gust, maneuver, taxi and take-off loads, which over the lifetime of a particular part eventually produces fatigue damage. Similarly, the pressurized envelope of an aircraft, including the fuselage skin and rear pressure bulkhead, are subject to a stress cycle on each flight where the aircraft interior is pressurized.

One problem inherent in fatigue damage is that it can be hidden since it generally occurs under loads that do not result in yielding of the structure. Fatigue damage is most often observed as the initiation and growth of small cracks from areas of highly concentrated stress. Undetected, a crack can grow until it reaches a critical size. At that point, the individual structural member can suddenly fail. Catastrophic failure of an entire structure can also occur when other members of the adjacent portions of the overall structure can not carry the additional load that is not being carried by the failed structural member.

Even stationary objects, such as railroad track or pressure vessels, may fail in fatigue because of cyclic stresses. Cyclic loads for railroad tracks are caused by repeated loading from the wheels running over an unsupported span of track. In fact, some of the earliest examples of fatigue failures were in the railroad industry and in the bridge building industry. Also, sudden pressure vessel failures can be caused by fatigue damage that has resulted from repeated pressurization cycles. Importantly, government studies report that fatigue damage is a significant economic factor in the U.S. economy.

Fatigue can be defined as the progressive damage, generally in the form of cracks, that occur in structures due to cyclic loads. Cracks typically occur at apertures (holes), fillets, radii and other changes in structural cross-section, as at such points, stress is concentrated. Additionally, such points often are found to contain small defects from which cracks initiate. Moreover, the simple fact that the discontinuity in a structural member such as a fuselage or wing skin from a hole or cutout forces the load to be carried around the periphery of such hole or cutout. Because of this phenomenon, it is typically found that stress levels in the material adjacent to fastener holes or cutouts experience stress levels at much greater than the nominal stress which would be experienced at such location, absent the hole or cutout.

It is generally recognized in the art that the fatigue life in a structure at the location of a through aperture or cutout can be significantly improved by imparting beneficial residual stresses around such aperture or cutout. Various methods have been heretofore employed to impart beneficial residual stress at such holes or cutouts. Previously known or used methods include roller burnishing, ballizing, split sleeve cold expansion, split mandrel cold working, shot peening, and pad coining. Generally, the compressive stresses imparted by the just mentioned processes improve fatigue life by reducing the maximum stresses of the applied cyclic loads at the edge of the hole. Collectively, these processes have been generically referred to as cold working. Basically, the presently known methods of cold working holes and other cutouts using tapered mandrel methods, coining, punching, and such are not adaptable to automated fastening systems and other automated environments because of their complexity and bulkiness of equipment. Also, presently known methods used by others do not treat the entire periphery of non-circular cutouts leading to potential fatigue life degradation. Finally, prior art countersink cold working methods require re-machining of the formed countersink, in order to achieve the desired fastener flushness.

Shortcomings of currently known methods for treating structures to provide enhanced fatigue life will be used as a basis for comparison with my novel, improved stress wave fabrication method. Heretofore known processes are not entirely satisfactory because:

they generally require that a starting hole be created in a workpiece, prior to initiating a stress fatigue life improving process;

they often require mandrels, split or solid, and disposable split sleeves, which demand precision dimensions, which make them costly;

mandrels and sleeves are an inventory and handling item that increases actual manufacturing costs when they are employed;

"mandrel" methods require a different mandrel for roughly each 0.003 to 0.005 inch change in hole diameter, since each sleeve is matched to a particular mandrel diameter, and consequently, the mandrel system does not have the flexibility to do a wide range of hole existing hole diameters;

each hole diameter processed with "mandrel" methods requires two sets of reamers to finish the hole, one for the starting dimension and another for the final dimension;

mandrel methods rely on tooling and hole dimensions to control the amount of residual stress in the part, and therefore the applied expansion can be varied only with a change of tooling;

mandrel methods require some sort of lubricant; such lubricants (and especially liquid lubricants), often require solvent clean up;

splits in a sleeve or splits in a mandrel can cause troublesome shear tears in certain 7000 series aluminum alloys;

the pulling action against mandrels, coupled with the aperture expansion achieved in the process, produces large surface marring and upsets around the periphery of the aperture;

split sleeve methods are not easily adapted to the requirements of automation, since the cycle time is rather long when compared with the currently employed automated riveting equipment;

mandrel methods are generally too expensive to be applied to many critical structures such as to aircraft fuselage joints, and to large non-circular cutouts;

mandrel methods have limited quality control/quality assurance process control, as usually inspections are limited to physical measurements by a trained operator.

OBJECTS, ADVANTAGES, AND NOVEL FEATURES

My novel stress wave manufacturing process can be advantageously applied to apertures for fasteners, to large holes in structures, to countersunk holes, to non-round cutouts from a workpiece, and to other structural configurations. Treating a workpiece structure for fatigue life improvement, prior to fabricating the aperture itself, has significant technical and manufacturing cost advantages. The method is simple, easily applied to robotic, automated manufacturing methods, and is otherwise superior to those manufacturing methods heretofore used or proposed.

From the foregoing, it will be apparent to the reader that one important and primary object of the present invention resides in the use of a novel method for treating a workpiece to reduce fatigue stress degradation of the part while in service, and to novel tool shapes for achieving such results.

Another objective of my method, and my novel tools useful for carrying out the method, is to simplify the manufacturing procedures, which importantly, simplifies and improves quality control in the manufacture of parts having an improved fatigue life.

Other important but more specific objects of the invention reside in the provision of an improved manufacturing process for enhanced service life metal parts subject to fatigue stress, as described herein, which:

eliminates the requirement for creating a starting hole, as well as tooling and labor costs associated therewith;

eliminates the requirement for purchase, storage, and maintenance of mandrels;

eliminates the requirement for purchase, storage, and maintenance of split sleeves;

eliminates the need for disposal of split sleeves;

eliminates the need for lubrication and subsequent clean-up during manufacture of structures containing apertures therethrough;

enables the manufacture of a wide range of aperture diameters, in which appropriate fastener diameters can be employed;

allows the magnitude and depth of the residual stresses to be carefully controlled, by way of the amount of energy input into the stress wave;

enables process control to be established using statistical feedback into the manufacturing system, thus enhancing quality assurance;

eliminates shear tears in a workpiece that are commonly encountered in mandrel manufacturing methods;

significantly reduces or effectively eliminates surface marring and upset associated with mandrel methods, thus significantly increasing fatigue life;

is readily adaptable to automated manufacturing equipment, since manufacturing cycle times are roughly equivalent to, or less than, cycle times for automated riveting operations;

eliminates bulky hydraulic manufacturing equipment typically used in mandrel methods, and substitutes simple, preferably electromagnetic equipment;

enables aperture creation after fatigue treatment, by a single reaming operation, rather than with two reaming operations as has been commonly practiced heretofore;

is sufficiently low in cost that it can be cost effectively applied to a number of critical structures, including fuselage structures.

Other important objects, features, and additional advantages of my invention will become apparent to the reader from the foregoing and from the appended claims and the ensuing detailed description, as the discussion below proceeds in conjunction with examination of the accompanying drawing.

SUMMARY

I have now invented, and disclose herein, an improved metal cold working process that uses stress waves to impart beneficial residual stresses to holes and to other features in parts subject to strength degradation through stress fatigue. This improved stress wave process does not have the above-discussed drawbacks common to heretofore-utilized cold working methods of which I am aware. The process overcomes the heretofore-encountered shortcomings of cold working processes. Also, it eliminates undesirable equipment necessary for the more commonly utilized alternative processes, such as the need for starting holes, for bulky hydraulic equipment, for precision mandrels, for disposable split sleeves, and for messy lubricants. Thus, it is believed that my novel method will substantially reduce manufacturing costs. In addition, my stress wave process is readily adaptable to use in automated manufacturing equipment. As a result, the unique process described herein is a major improvement over other processes in common use today, including mandrel processes.

My improved stress wave method imparts beneficial stresses using a dynamic indenter that impinges the surface of the metal, preferably in a normal direction to the surface. The action of the indenter causes waves of elastic and plastic stress to develop and propagate through the metal. In some cases a stationary indenter or an anvil is used to support thin workpiece materials. Such "backing indenters or anvils also assist in the reflection and or creation of plastic waves off or from the other side of the workpiece.

After a properly applied and focused plastic stress wave has imparted a large zone of residual stress, the area is now ready for the hole. A drill, reamer or other cutting device is positioned concentric to the impact zone from the indenter and/or anvil. When the hole is machined a small rebound of the stresses surrounding the hole occurs. Such rebound manifests itself as shrinking of the machined hole. For this reason, the cutting tools used in my stress wave method may require the use of a feature that takes into account the inward metal movement in a hole. Otherwise, the workpiece material would have the possibility of binding on the cutting tool. This could lead to short tool life or poor hole finish. For a drill or reamer, a simple solution to this requirement is to provide a back-taper feature. As a result, substantially uniform beneficial residual compressive stresses remain in finished structures.

BRIEF DESCRIPTION OF THE DRAWING

FIGS. 1(a)(1)–1(a)(5) show the various steps for improving the fatigue life of a transverse hole in an initially solid bar using the stress wave process.

FIGS. 1(b)(1)–1(b)(5) show the steps for another method of treating a transverse hole in an initially oversized solid bar using the stress wave process.

FIGS. 1(c)(1)–1(c)(5) the process steps for yet another method of treating a transverse hole in an initially solid bar using the stress wave process, where the diameter of the bar is initially oversized and has a "flat" to facilitate the treatment of the workpiece FIGS. 1(d)(1)–1(d)(5) show the process steps for yet another method of treating a solid bar using the stress wave process. FIGS. 2(a)(1)–2(a)(4), 2(b)(1) and 2(b)(2) show the steps for treating an initially hollow bar, with internal support, using the stress wave process.

FIGS. 2(c)(1)–2(c)(4) show the steps for treating an initially hollow bar, without internal support, using the stress wave process.

FIGS. 3(a)–3(c) show the treatment of a hole in a tapered cross-section using the stress wave process.

FIGS. 5(a)–5(d) show the treatment of a "two-eared" lug using the stress wave process starting from a solid, partially machined configuration.

FIGS. 7(b)(1)–7(b) 4 are similar to FIGS. 7(a)(1)–7(a)(3) the simultaneous or sequential treatment of a pattern or set of holes. The plan form view of a pattern of four holes around a center hole is not representative of all hole patterns, but is used for illustrative purposes.

FIGS. 7b is similar to FIG. 7a, but now illustrates the use of an optional support device, typically a close fitting metal structure that resists deformation along a free edge of the part from processing holes near the free edge.

FIG. 9(a)–9(i) show the treatment of a very thick part using the stress wave process, where treatment at the surface of the part, either one-sided or two, is not sufficient to improve the fatigue life of the entire length of the hole, so a sequential process is utilized.

FIG. 10 illustrates the use of the stress wave process to treat slots and notches in turbine disks, shafts, gears and the like, where residual stress is imparted in the area most needed, which in the case illustrated, is at the root of the notch or slot.

FIGS. 11(a)–11(c) show the processing of a large hole using a smaller diameter indenter via imparting an overlapping pattern of dimples in a workpiece, to create a fairly uniform residual stress around the perimeter of the hole. FIGS. 12(a)–12(c) are very similar to FIGS. 11(a)–13(c), except that the hole is non-circular, and thus it is shown that the same overlapping indenter technique just illustrated in FIG. 11 can also be adapted to non-round holes as well.

FIG. 14 illustrates another embodiment of an optimized indenter for use in stress wave cold working to create desirable residual stress patterns in a workpiece; in the indenter illustrated in this Figure, a flat portion, a chamfered portion and a curved portion are used to approximate a desirable curvature at the working end of the indenter.

FIG. 15 is similar to FIG. 14, but here a raised, drill-centering feature has been added, which allows a drilling tool to align itself with the center of the dimple to improve hole concentricity with the dimple, reduce drill chatter and to improve the quality of the hole.

DETAILED DESCRIPTION

Figure 4A:
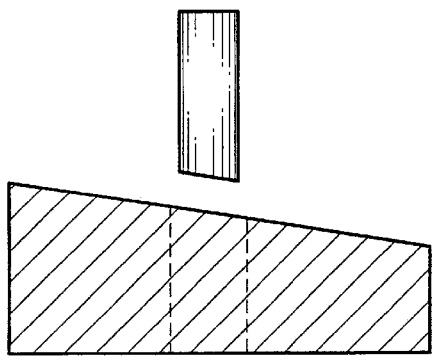
FIGS. 4(a)–4(c) show the treatment of a hole in another tapered cross-section using the stress wave process.

Attention is directed to FIG. 1a, which shows the various steps for improving the fatigue life of a transverse hole via use of the stress wave process. Step 1 shows the setup step for processing the bar. The dotted line shows the outline of the transverse hole. Opposing indenters are positioned over the desired location of the hole. The indenters have an end profile for imparting optimized levels of beneficial residual stresses necessary for fatigue life improvement. In a typical application the diameters of the indenters are smaller than the final diameter of the transverse hole. Additionally, the indenters are made from material that is higher in strength than the bar material. Step 2 shows the indenters acting on the bar. The indenters are quasi-statically squeezed, actuated at a high velocity or "excited" with a stress wave to impart dimples of a prescribed depth to the bar. Afterwards the hole is machined out as shown in step 3 removing the dimples. The final cross sectional bar configurations are shown in Step 4. The first configuration shows the bar with the transverse hole. The second configuration shows the bar with the same transverse hole, but hollowed out for reduced weight or other function. Even with a large portion of material removed there is sufficient residual compressive stress around the hole to provide fatigue life improvement. The stress wave process is effective for bars under tensile, bending, torsional and combined loads. Configurations of this sort can be found on pipes, tubing, medical implants, bushings, crack shafts, drive shafts and the like.

FIG. 1b shows the steps for another method of treating a transverse hole in an initially oversized solid bar using the stress wave process. In this instance the diameter of the solid bar is initially oversized to allow for "cleanup" of any surface upset caused by using the method of FIG. 1a. A deeper dimple is necessary than was used in the method of FIG. 1a, as the surface layer of the beneficial residual stresses will be machined away. The setup step for processing the bar is shown in Step 1. The dotted lines show both the outline of the transverse hole and the final outside diameter of the bar while the solid line shows the current diameter. The opposing indenters are positioned over the desired hole location. The end shapes of the indenters have a profile for imparting optimal beneficial residual stresses sufficient for fatigue life improvement using deeper dimple depths. Step 2 shows the indenters acting on the bar. The indenters are either quasi-statically squeezed, actuated at a high velocity or excited using stress waves to impart dimples to the bar to a prescribed depth. The indenters may be pressed past the diameter (dotted line) of the final bar shape as shown. Some bar configurations may require a smaller dimple depth such that the indenters do not penetrate the boundary of the final bar diameter. Therefore, a residual dimple (as shown) may or may not be present during the hole machining process depending on which depth of indenter penetration was selected. After treatment by the indenters and turning down the bar, the hole is then machined out as shown in step 3. The final cross sectional bar configurations are shown in Step 4. The first configuration shows the bar with a transverse hole. The second configuration shows the bar with the same transverse hole, but hollowed out for reduced weight or other function.

FIG. 1c shows the process steps for yet another method of treating a transverse hole in an initially solid bar using the stress wave process. In this instance the diameter of the bar is initially oversized and has a "flat" to facilitate the stress wave process. The flat may be understood as a machined flat, counterbore, spot face and the like. The flat facilitates the use of indenter end shapes that are typically used for flat stock. The oversized bar diameter is necessary to produce the flats and allows for some "cleanup" of any surface upset caused by using the method of FIG. 1a. The setup step for processing the oversized bar with flat is shown in Step 1 with the opposing indenters positioned over the desired hole location. The dotted lines show both the outline of the transverse hole and the final outside diameter of the bar while the solid line shows the current diameter and flat configuration. The end shapes of the indenters have an optimal profile for imparting levels of beneficial residual stresses for fatigue life improvement on flat stock. Step 2 shows the indenters acting on the bar. The indenters are quasi-statically squeezed, actuated at a high velocity or excited with stress waves to impart dimples, at a prescribed depth, to the bar. The hole is machined out as shown in step 3 completely removing the dimples. The final cross sectional configurations are shown in Step 4. The first configuration shows the bar with the transverse hole. The second configuration shows the bar with the same transverse hole, but hollowed out for reduced weight or other function.

FIG. 1d shows the process steps for yet another method of treating a solid bar using the stress wave process. In this instance the diameter of the bar has integrally cast or machined flats. The flat may be understood as a raised feature on the bar. The raised flat facilitates the use of indenter end shapes that are typically used for flat stocks The raised flats also allow for "cleanup" of any surface upset produced by the method of FIG. 1a. The setup step for processing bar with integral flats is shown in Step 1. The solid line shows the final bar diameter and raised flat configuration and the dotted lines show the outline of the transverse hole. The opposing indenters are positioned over the desired hole location. The end shapes of the indenters have an optimal profile for imparting beneficial residual stresses sufficient for fatigue life improvement on flat stock. Step 2 shows the indenters acting on the raised flats of the bar. The indenters are quasi-statically squeezed, actuated at a high velocity or excited with stress waves to impart dimples, at a prescribed depth, to the bar. The hole is machined out as shown in step 3 entirely removing the dimples. The final cross sectional configurations are shown in Step 4. The first configuration shows the bar with a transverse hole. The second configuration shows the bar with the same show transverse hole, but hollowed out for reduced weight or other function.

FIGS. 2a and 2b shows the steps for treating an initially hollow bar, with internal support, using the stress wave process. Typically, a bar with a thin wall would be internally supported. Step 1 shows the setup step for processing the bar. The opposing indenters are positioned over desired hole location. The end shapes of the indenters have an optimal profile for imparting beneficial residual stresses sufficient for fatigue life improvement. In a typical application the diameters of the indenters are smaller than the final diameter of the hole. Additionally, the indenters are made from material that is higher in strength than the bar material. Step 2 shows the indenters acting on the hollow bar with a support member that tightly conforms to the inside surface of the bar. The support member is necessary only to carry the load of the indenters across the section. It is not required that the cross section of the support member be completely circular. Any shape that reacts the indenters while minimizing deformation of the cross-sectional shape of the bar is allowed. The indenters are quasi-statically squeezed, actuated at a high velocity or excited using stress waves to impart dimples, to prescribed depth, to the bar. Afterwards the internal support member is withdrawn and the hole machined as shown in Step 3. The final configuration is shown in Step 4. FIG. 2b, Steps 1 and 2, show more detail of the internal support member. A high strength mandrel-like device with front and back tapers and a flat between supports the tube and reacts the load from the indenters. The front and back tapers facilitate installation and removal. Because the indenters provide some cross-sectional deformation to the bar it is desirable to have the mandrel connected to some sort of device with sufficient force to either push or pull the mandrel from the hollow bar after processing. A tightly conforming mandrel reshapes the hollow cross section of the bar. It is desirable to put a lubricant, either wet or dry, on the mandrel to facilitate removal and to reduce galling. The stress wave process is effective for hollow bars under tensile, bending torsional and combined loads. Configurations of this sort can be found on pipes, tubing, medical implants, bushings, crack shafts, drive shafts and the like.

FIG. 2c shows the steps for treating an initially hollow bar, without internal support, using the stress wave process. Typically, an internally unsupported bar would have a relatively thick wall to prevent excessive cross sectional deformation. Step 1 shows the setup step for processing the bar. The opposing indenters are positioned over the desired hole location. The end shapes of the indenters have an optimal profile for imparting beneficial residual stresses sufficient for fatigue life improvement. Step 2 shows the indenters acting on the hollow bar. The indenters are either quasi-statically squeezed or actuated at a high velocity to impart dimples, to prescribed depth, in the bar. The hole is machined out and the dimples completely removed as shown in step 3. The final configuration is shown in Step 4.

FIG. 3 shows the treatment of a hole in a tapered cross-section using the stress save process. Step 1 shows the setup step for the process. Two opposing indenters, smaller than the final hole diameter are lined up at the desired hole location. The indenters are actuated into the tapered section either by squeezing, high-speed impact or stress wave excitation. The end shapes of the indenters are angled to conform to the tapered shape of the section and to provide a large zone of compressive residual stress. After the action of the indenters the hole is machined out completely removing the dimples. The final hole is surrounded by residual compressive stresses sufficient to improve the fatigue life of the section.

Figure 4B:
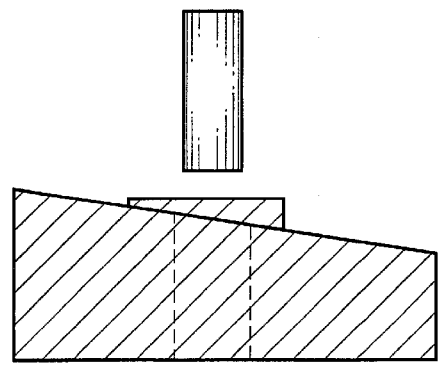
Figure 4C:
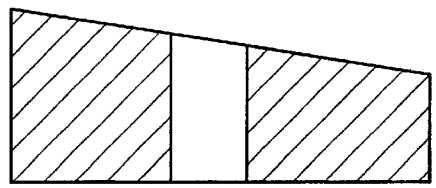
Figure 6A:
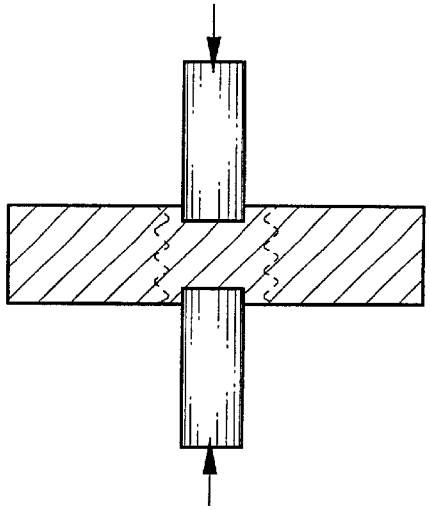
FIGS. 6(a)–6(d) show the treatment of a threaded hole using the stress wave process.
Figure 6B:
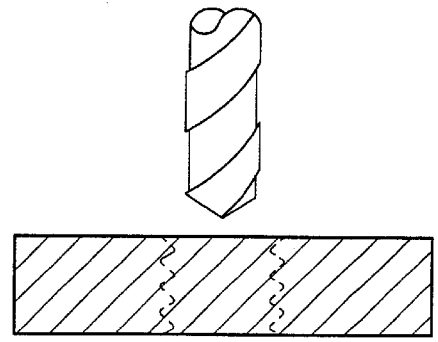
Figure 6C:
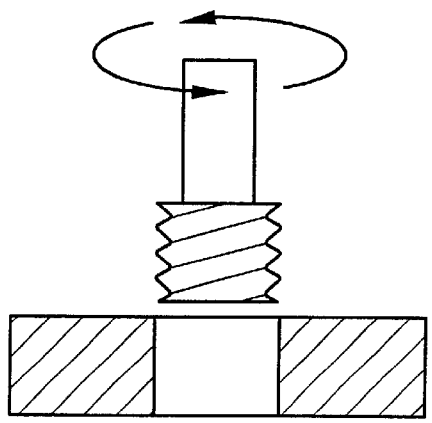
Figure 6D:
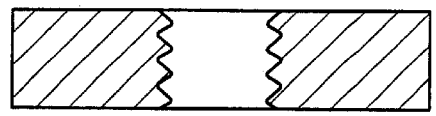
Figure 8A:
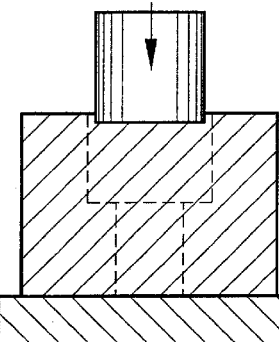
FIGS. 8(a)–d show the treatment of a stepped hole using a one-sided indenter method.
Figure 8B:
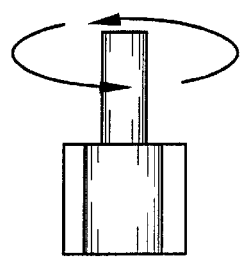
Figure 8C:
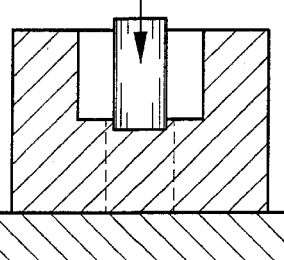
Figure 8D:
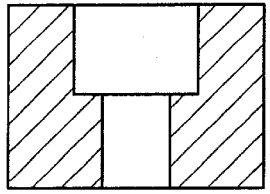
Figure 13A:
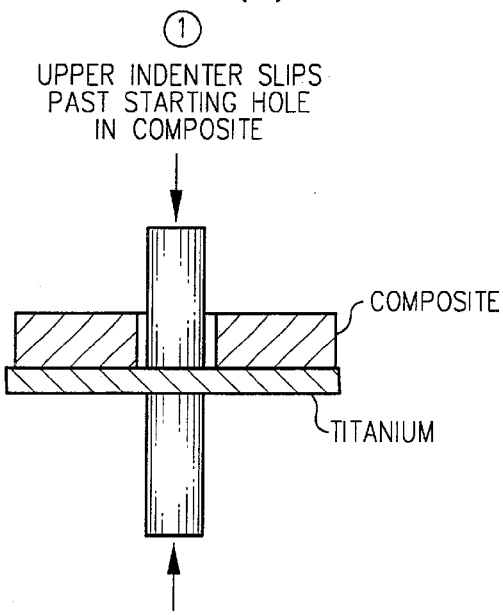
FIGS. 13(a)–13(d) show the treatment of a metal structure with an overlaying fibrous composite material, where, since the composite material would be severely damaged from the action of the indenter, it is necessary to first machine a clearance hole into the composite.
Figure 13B:
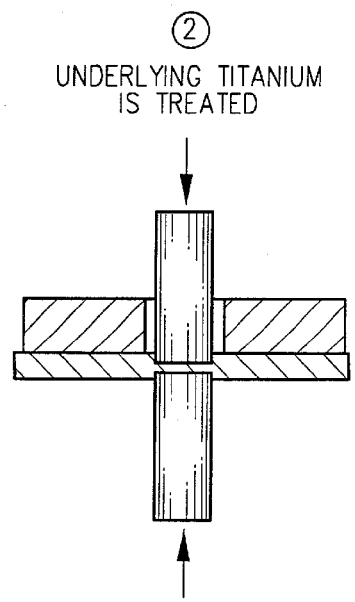
Figure 13C:
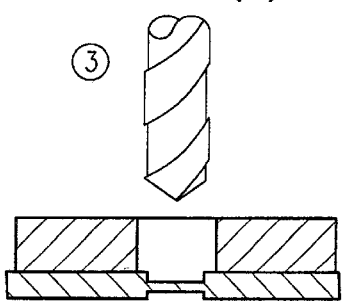
Figure 13D:
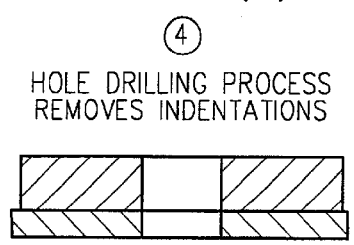

FIG. 4 shows the treatment of a hole in another tapered cross-section using the stress wave process. This section has one tapered side and one straight side. In one instance the section has an integral raised flat to facilitate the process. Step 1 shows the setup step for the process. Two opposing indenters, smaller than the final hole diameter are lined up at the desired hole location. The indenters are actuated into the tapered section either by squeezing, high-speed impact or stress wave excitation. The end shape of one of the indenters is angled to conform to the tapered side of the section and to provide a large zone of compressive residual stress. The other indenter end shape has a profile for working a flat surface. In the instance of an integral flat, both indenter end shapes are configured for processing a flat part. After the action of the indenters the hole is machined out completely removing the dimples. In the instance of the integral flat, it too, is machined off. The final hole is surrounded by residual compressive stresses sufficient to improve the fatigue life of the section.

FIG. 5 shows the treatment of a "two-eared" lug using the stress wave process starting from a solid, partially machined configuration. Partially machined is defined in this case as the holes and center slot have not yet been machined. Step 1 shows the action of the indenters acting on the part at the desired hole location. Step 2 shows the final configuration; dimple removed, holes machined and center slot cut. The lug now configured has residual stress sufficient for life improvement in both ears of the lug. The lug can be a single or multiple "eared" lug.

FIG. 6 shows the treatment of a threaded hole using the stress wave process. The action of the indenters is shown in Step 1. Afterwards the hole is drilled out to a starting diameter appropriate for cutting threads as shown in Step 2. The hole is then machined or tapped to produce threads to accommodate a threaded bolt or fastener as shown in Step 3. The final configuration is shown in Step 4. Applications include panels, lug nuts, engine components or any other structure that has threaded holes to accommodate a threaded bolt.

FIG. 7a shows the simultaneous or sequential treatment of a pattern or set of holes. The plan form view of a pattern of four holes around a center hole is not representative of all hole patterns, but is used for illustrative purposes. The holes in the pattern, or set, do not necessarily need to be the same size or require the same dimple depth. In high volume applications such as an engine blocks or automotive wheels, it is desired to treat many, if not most, of the holes simultaneously. This reduces the time required to treat each part and increase production throughput. In those instances where it is not practical to treat the entire pattern simultaneously, then the processing can be broken down into sets of holes or even individual holes. The treatment of a pattern of holes can be performed, depending on the particular fatigue life requirements of the structure, from either one side or two sides. The indenter end shapes and dimple depths can be tailored to suit the hole diameter in the pattern. The holes, after treatment can be machined as straight through holes, straight non-through holes, stepped holes, countersink holes, or any other hole configuration.

FIG. 7b is the same as FIG. 7a except for an optional support device. The support is typically a close fitting metal structure that resists deformation along a free edge of the part from processing holes near the free edge. The basic process of treating the holes involves a relatively large radial plastic flow of material outward from the indenter. For structure where treated holes or other cutouts are near a free edge the radial plastic flow tends to distort or deform the edge. In instances where this deformation is not allowed a support device may be used. The specific configuration in the figure is for instructional purposes only. Any support device, whether an internal plug, straight rail, outer ring structure and like, can be used to resist the deformation at a free edge. View 1 shows an internal support that resists the internal free edge deformation from the one-sided treatment of a hole or pattern of holes near the edge. View 2 is similar to View I except that the internal support is allowed to pass through a hole in the underlying support. This arrangement is helpful for high-volume applications where tools may be acting on both sides of the part. It may also be understood that the internal support fits into a recess in the underlying support. View 3 shows two-sided treatment of a part using an internal support. In each view, a portion of the support matches the surface of the free edge of the part that it supports. The views show an edge that is perpendicular to the face of the part, but it should be understood a support can be made to match an angled, stepped, curved, grooved or other edge geometry.

FIG. 8 shows the treatment of a stepped hole using a one-sided indenter method. A large anvil like structure that reacts the force of the indenter supports the component being treated. A first indenter, sized to treat the larger diameter of the stepped hole, is used initially. Step I shows the first indenter being used on a thick part. The dotted line within the part shows the outline of the stepped hole that will be machined into the part after final processing. After indenting with the first indenter, the larger diameter portion of the hole is machined into the part as shown in Step 2. The machining is done to provide a uniform, though not necessarily flat, surface for the second indenter. The second indenter is then used to treat the remainder of the part associated with the smaller diameter portion of the hole as shown in Step 3. After treatment with the second indenter the hole is machined to final shape as illustrated in Step 4. The hole, now treated, has improved fatigue resistance. An optional bushing or wear guide may show be installed into the larger diameter portion of the hole.

FIG. 9 shows the treatment of a very thick part using the stress wave process. For very thick parts a single treatment at the surface of the part, either one-sided or two, is not sufficient to improve the fatigue life of the entire length of the hole. A sequential process is used much like the stepped hole in FIG. 8, but uses the same diameter indenter throughout the process. Step 1 shows the initial process step of treating with the indenter. The dotted line shows the final hole configuration. The dimple and a portion of the depth of the hole are machined into the part as shown in Steps 2 and 3. The machining is done to provide a uniform, though not necessarily flat, surface for the next use of the indenter. This process of alternately indenting and machining proceeds through steps 4, 5, 6, 7, 8, and 9 until the entire length of the hole is treated. The final configuration is shown in Step 10.

In some cases only a portion of the hole in a thick stack needs to be treated. In those cases the intermediate and/or final indenter steps may be eliminated. This same process can be used to treat a non-through (dead end) hole. In this instance some of the final machining may be eliminated to produce the desired configuration.

FIG. 10 shows the uses of the stress wave process to treat slots and notches in turbine disks, shafts, gears and the like. The process works here by imparting residual stress in the area most needed—in this case the root of the notch or slot. The notch root is typically the area of highest stress concentration fatigue crack initiation. Indenters are used to impart residual stress in the area of the notch root, and then the notches are machined in completely eliminating the dimples. The resulting residual stresses provide fatigue life in the area most needed; at the notch root. A representative slot outline is shown in Step 1. Dimples are placed at the notch root locations in Step 2. Step 3 shows three notches treated with the process while Step 4 shows the area of treatment. The indenters may be used sequentially or actuated in a pattern, or set, of indenters described in FIG. 7.

FIG. 11 shows how to process a large hole using a smaller diameter indenter using an overlapping pattern of dimples. The overlapping pattern creates a fairly uniform residual stress around the perimeter of the hole. When the hole is machined into the part the dimples are removed and a zone of residual stress remains around the periphery thereby improving the fatigue life of the part.

FIG. 12 is very similar to FIG. 11 except that the hole is non-circular. The same technique used in FIG. 11 can be adapted to non-round holes as well. The overlapping technique can be used on application where a variety of hole diameters and hole shapes requiring treatment exist, but the number of tool changes allowed by the automated machinery is low.

FIG. 13 shows the treatment of a metal structure with an overlaying fibrous composite material. Since the composite material would be severely damaged from the action of the indenters it is necessary to first machine a clearance hole into the composite. The composite has little ability to sustain loads normal to its surface. Further, the large deformation associated with the stress wave process would cause damage to the continuous fibers that extend beyond the diameter of the hole. Therefore, indenting composite materials should be avoided. The clearance hole allows the passage of an indenter from the top surface as shown in Step 1. Actuating the indenters treats the underlying metal. The part is now ready to be drilled removing the dimples in the metal and providing a smooth continuous hole through the part. The structure now has improved fatigue life in the underlying metal while precluding damage to the composite.

FIG. 14 illustrates another embodiment of the optimized indenter for use in stress wave cold working to create desirable residual stress patterns in a workpiece; in this embodiment, a flat portion, a chamfered portion and a curved portion are used to approximate a desirable curvature at the working end of the indenter. The proportions and particular shapes for the flat, chamfer and curved portions depend on several variables including: material being treated, hole diameter, stack thickness, number of layers, depth of indenter penetration and indenter material. The chamfered portion of the indenter is offset from the flat central portion by an angle theta (θ), which is preferably provided in the range from zero to fifteen degrees. The curved portion of the indenter may be described as a constant radius, parabolic shape, hyperbolic shape, spline or any other shape that imparts optimized residual compressive stresses into the part. The flat, chamfered and curved portions may be present in any sequence and any number. In some embodiments, one or all of these features may be non-existent. The features may optionally be connected with a small blend radius.

FIG. 14 shows an indenter end profile that approximates a uniform pressure profile shape, such as was described in earlier patent applications referenced above. It is another end shape that can be conventionally manufactured and has been shown to be effective at improving a structure's fatigue life. The shape can be described as having a centrally located flat portion with diameter that ranges from ¼ to ⅔rds the overall diameter of the indenter. Moving outward from the center, a chamfered portion that has an angle, relative to the flat, ranging from 2 to 10 degrees, follows the flat portion. The inside diameter dimension of the chamfered portion of the indenter end ranges from ¼ to ⅔ the overall diameter of the indenter. The outside diameter dimension of the chamfer ranges from ½ the overall indenter diameter to the edge of the indenter diameter. A constant radius, or alternatively a varying smooth curve, blends the chamfered portion of the indenter end shape to the overall diameter of the indenter. The constant blend radius ranges from 5 to 20% of the overall diameter if the indenter.

FIG. 15 is similar to FIG. 14, but a raised, drill-centering feature has been added. The drill center feature allows a drilling tool to align itself with the center of the dimple to improve hole concentricity with the dimple, reduce drill chatter and improve the quality of the hole. The additional raised feature conforms to any drill geometry. The height of the feature typically ranges from 0.020 to 0.100 inches depending on the overall indenter diameter.

It is to be appreciated that my novel processes for cold working parts to reduce fatigue stress degradation of the part, are an appreciable improvement in the state of the art of cold working metal parts subject to fatigue concerns. Importantly, my method of employing the stress waves treats the process of cold working from a new perspective, preferably by entirely treating the hole before it is machined. Thus, the methods disclosed herein provide substantial improvement over currently used treatment methods by eliminating expansion mandrels, sleeves, and hole lubricants.

In the further improved method described herein, the control of the magnitude and depth of residual stress is determined by the properties and characteristics of a particular workpiece, nature of the force imparted on the workpiece, as particularly and effectively accomplished via advantageous use of stress waves. Importantly, the process does not need to rely on tooling tolerances. Moreover, the processes disclosed herein are readily automated and can be put into any automated manufacturing environment. One further benefit of the process is that the use of stress waves also can eliminate distortions and tears around the holes, like those that may be caused during expansion by mandrel methods.

Although only a few exemplary embodiments of this invention have been described in detail, it will be readily apparent to those skilled in the art that my novel methods for cold working metal, and the tooling and other apparatus for advantageously implementing such processes, may be modified from those embodiments provided herein, without materially departing from the novel teachings and advantages provided herein, and may be embodied in other specific forms without departing from the spirit or essential characteristics thereof. Therefore, the embodiments presented herein are to be considered in all respects as illustrative and not restrictive. As such, the claims are intended to cover the structures described herein and not only structural equivalents thereof, but also equivalent structures. Thus, the scope of the invention is intended to include all variations described herein, whether in the specification or in the drawing, including the broad meaning and range properly afforded to the language and description set forth herein to describe such variations.

It will thus be seen that the objects set forth above, including those made apparent from the preceding description, are efficiently attained. Since certain changes may be made in carrying out methods for coldworking of metals according to the teachings herein, it is to be understood that my invention may be embodied in other specific forms without departing from the spirit or essential characteristics thereof. Many other embodiments are also feasible to attain advantageous results utilizing the principles disclosed herein. Therefore, it will be understood that the foregoing description of representative embodiments of the invention have been presented only for purposes of illustration and for providing an understanding of the invention, and it is not intended to be exhaustive or restrictive, or to limit the invention only to the precise forms disclosed.

All of the features disclosed in this specification (including any accompanying claims, and the figures of the drawing) may be combined in any combination, except combinations where at least some of the features are mutually exclusive. Alternative features serving the same or similar purpose may replace each feature disclosed in this specification (including any accompanying claims, the various figures of the drawing), unless expressly stated otherwise. Thus, each feature disclosed is only one example of a generic series of equivalent or similar features. Further, while certain materials are described for the purpose of enabling the reader to make and use certain embodiments shown, such suggestions shall not serve in any way to limit the claims to the materials disclosed, and it is to be understood that other materials, including other metals and various compositions, may be utilized in the practice of my methods, and in the manufacture of novel structures therewith.

The intention herein is to cover all modifications, equivalents, and alternatives falling within the scope and spirit of the invention, as expressed herein above and in the appended claims. As such, the claims are intended to cover the structures, apparatus, and methods described herein, and not only the equivalents or structural equivalents thereof, but also equivalent structures or methods. The scope of the invention, as described herein and as indicated by the appended claims, is thus intended to include variations from the embodiments provided which are nevertheless described by the broad meaning and range properly afforded to the language of the claims, as explained by and in light of the terms included herein, or the legal equivalents thereof.

What is claimed is:

1. Tooling for working a structure to improve the fatigue strength at a selected location in said structure, said structure comprising a first surface, a second surface, and a body therebetween, said tooling comprising:
    a first indenter, said first indenter comprising a contacting end for engagement with and deformation of a pre-selected portion of said first surface of said structure to impart a residual stress profile in said body of said structure,
    and wherein said contacting end of said first indenter comprises a pre-selected shaped surface profile for imparting a pre-selected pressure profile in said first surface of said structure.

2. Tooling as set forth in claim 1, further comprising a second indenter, said second indenter comprising a contacting end for engagement with and deformation of a pre-selected portion of said second surface of said structure to impart a pre-selected residual stress profile in said body of said structure, and wherein said contacting end of said second indenter comprises a pre-selected shaped surface profile for imparting a pre-selected pressure profile in said second surface of said structure.

3. Tooling as set forth in claim 1, wherein said first indenter further comprises a downwardly projecting centering punch portion.

4. Tooling as set forth in claim 2, wherein said second indenter further comprises a downwardly projecting centering punch portion.

5. Tooling as set forth in claim 1, wherein said first indenter comprises a dynamic indenter, said dynamic indenter adapted for engagement of said shaped surface of said contacting end against said first surface of said structure, to produce stress waves in said structure.

6. Tooling as set forth in claim 1, wherein said second indenter comprises a second dynamic indenter, said second dynamic indenter adapted for engagement of said shaped surface of said contacting end against said second surface of said structure, to produce a stress wave in said structure.

7. An apparatus for treating material bounding the location selected for creation of an opening in a workpiece, in order to provide beneficial residual stress in material bounding said opening, to thereby improve fatigue life of said workpiece, said apparatus comprising:
    a support structure, said support structure adapted to securely support a workpiece;
    a shaped indenter having a contacting end; and
    a dynamic indenter driver, said dynamic indenter driver adapted to drive said contacting end of said shaped indenter into a pre-selected surface portion of said workpiece at a velocity sufficient to cause formation of a stress wave in said workpiece in reaction to the action of said contacting end of said shaped indenter; and
    wherein said contacting end of said shaped indenter further comprises a surface shape that provides a pre-selected residual stress profile to said workpiece.

8. The apparatus as set forth in claim 7, further comprising an anvil, said anvil positioned in a firm backing relationship with said workpiece, so that when said indenter acts on said workpiece, said workpiece is substantially supported by said anvil against movement in a direction normal to the direction of impact of said indenter.

9. The apparatus as set forth in claim 7, further comprising a second indenter and a second indenter driver, and an indenter driver controller, and wherein said first indenter driver and said second indenter driver are responsive to said indenter driver controller to simultaneously impact an obverse side and a reverse side of said workpiece, respectively.

10. The apparatus as set forth in claim 9, wherein said first indenter further comprises a pilot alignment guide, and wherein said second indenter further comprises a plot alignment guide receiving portion, said pilot guide disposed through said workpiece for close interfitting engagement with said pilot guide receiving portion of said second indenter, so that during impact of said workpiece by said first indenter and said second indenter, said pilot alignment guide is received by said pilot guide alignment receiving portion.

11. The apparatus as set forth in claim 8, wherein said anvil further comprises a pilot alignment guide, and wherein said first indenter further comprises a pilot alignment guide receiving portion, said pilot guide disposed through said workpiece for close interfitting engagement with said pilot guide receiving portion of said first indenter, so that during impact of said workpiece by said first indenter, said pilot alignment guide is received by said pilot alignment guide receiving portion.

* * * * *